June 11, 1963 G. DZUGAN 3,093,345
APPARATUS FOR DISTRIBUTING STRANDS
Filed Jan. 9, 1961 3 Sheets-Sheet 1
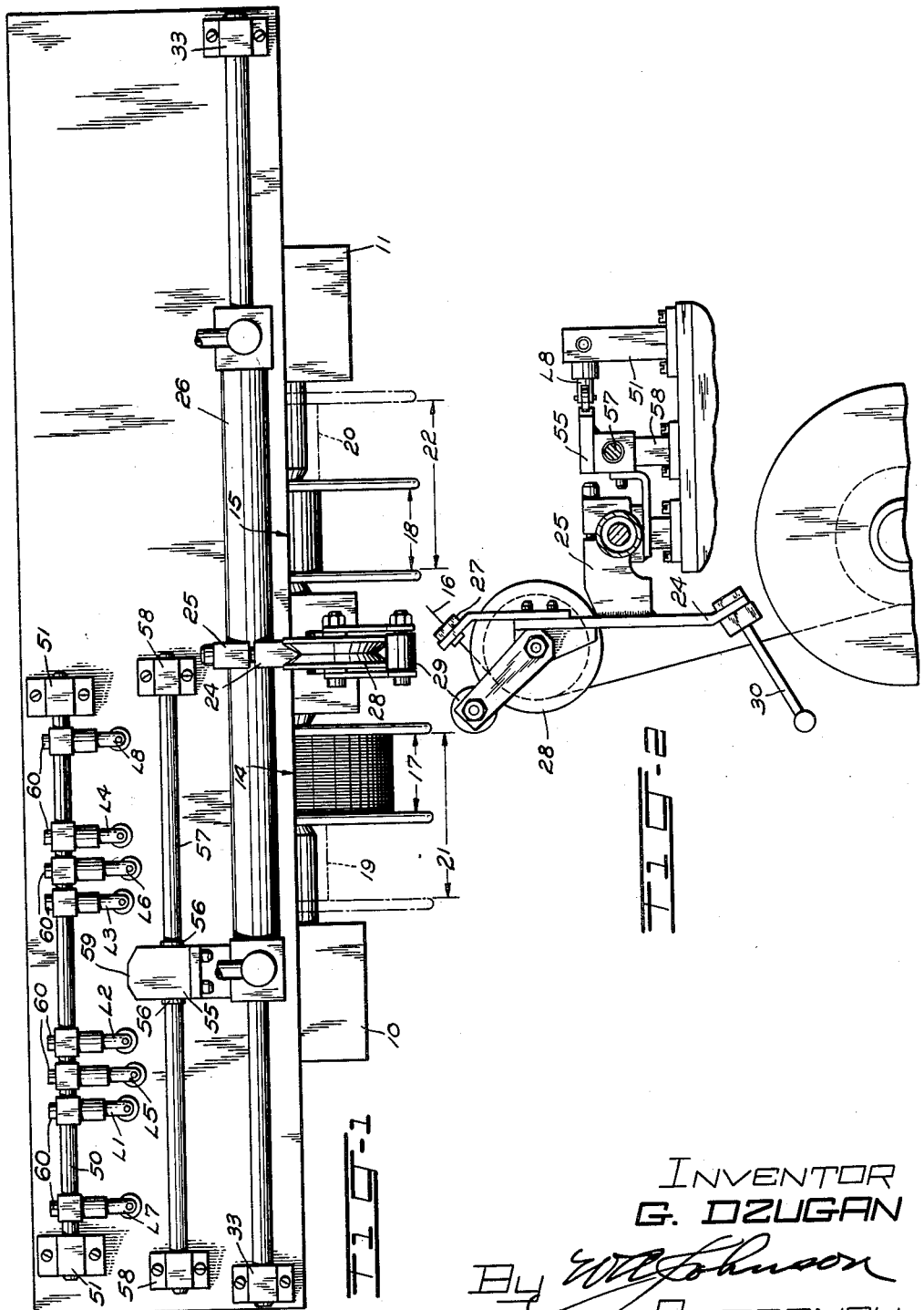
INVENTOR
G. DZUGAN
By
ATTORNEY

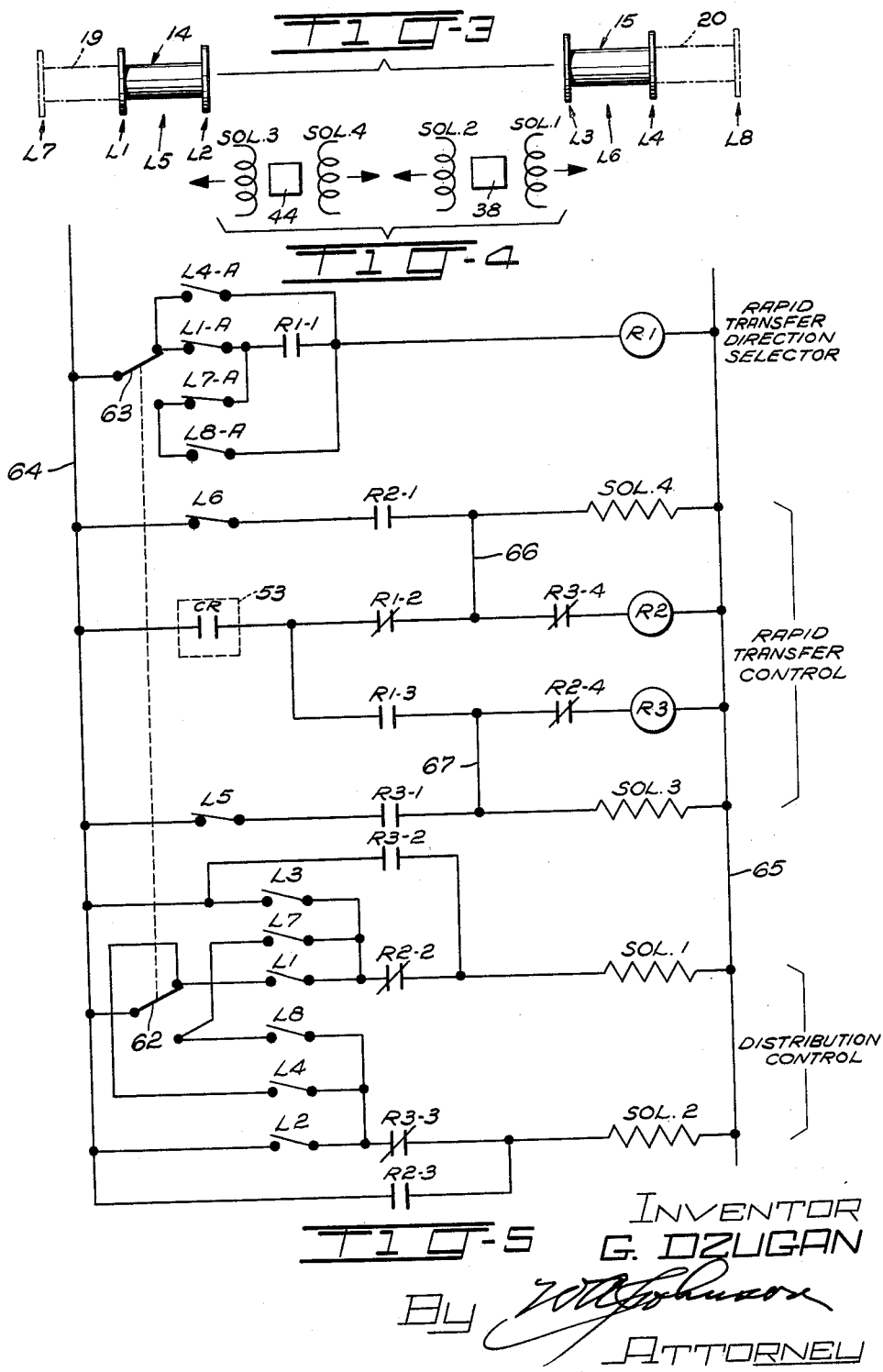

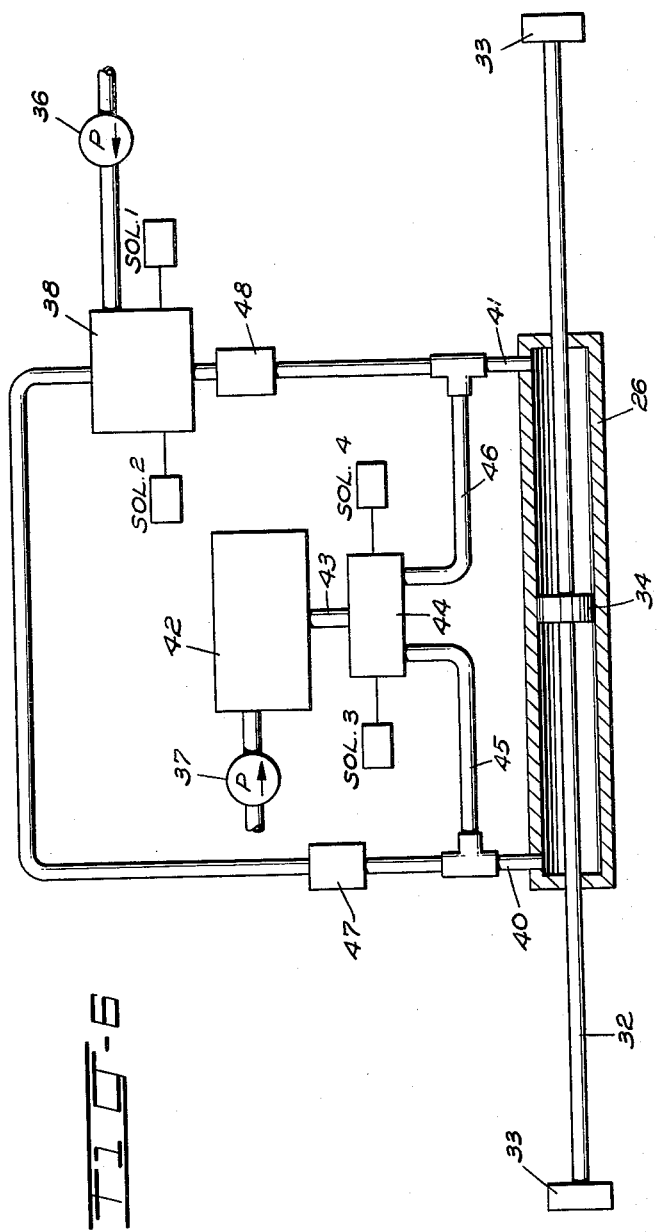

United States Patent Office 3,093,345
Patented June 11, 1963

3,093,345
APPARATUS FOR DISTRIBUTING STRANDS
George Dzugan, Clark, N.J., assignor to Western Electric Company, Incorporated, New York, N.Y., a corporation of New York
Filed Jan. 9, 1961, Ser. No. 81,420
2 Claims. (Cl. 242—158.4)

This invention relates to apparatus for distributing strands, particularly apparatus for distributing strands or wires continuously on rotatably driven take-up members of different lengths.

In the manufacture of plastic covered wire received continuously from an extruder, continuous take-up means must be provided therefor. Such distributing means has been in use for some time wherein a distributor arm is reciprocated in one area to distribute a strand or wire on one reel, or in an area of a given length, and after a measured amount is distributed in the first area or on the first reel, the distributor is moved to another area of like length or another reel of the same size. However, it has been found desirable to wind strands or wires in areas of different lengths or on reels of different sizes which could not be accomplished by the known distributing apparatus.

An object of the present invention is a highly efficient and completely automatic apparatus for distributing a strand on rotatably driven take-up means of different lengths.

In accordance with the object, the invention comprises controls for a distributor arm including limit switches arranged so that in a fluid operated moving means for the distributor, the strand may be distributed in selectively variable areas of different lengths.

More specifically, the electro-pneumatic control for the apparatus is divided into three parts, one including certain of the limit switches to bring about the distributing slow-moving motions of the distributor arm, another under the control of a counter relay to cause rapid transfer of the distributor arm from one area or reel to another, and a third control portion, identified as the rapid transfer direction selector, which conditions the rapid transfer control to move in the right direction to transfer the strand or wire from a filled area or reel to an empty area or reel.

Other objects and advantages will be apparent from the following detailed description when considered in conjunction with the accompanying drawings wherein:

FIG. 1 is a top plan view of the apparatus;
FIG. 2 is a side elevational view of the apparatus;
FIG. 3 is a schematic illustration of the winding areas or reels of different sizes;
FIG. 4 is a schematic illustration of the solenoid valves and the direction of movement of the distributing arm;
FIG. 5 is a schematic illustration of the electrical controls, and
FIG. 6 is a schematic illustration of the fluid operating means for the apparatus.

Considering FIGS. 1 and 2, FIG. 1 in particular illustrates the apparatus as comprising fluid operated cylinders 10 and 11 with piston rods carrying cone centers at their outer and movable varied distances to support take-up members or reels of different sizes or lengths. Reels indicated generally at 14 and 15 are being employed to receive a strand 16. In other words, the strand, in the present illustration, is being distributed in areas 17 and 18 which are identical. If desired, larger reels 19 and 20 may be supported by the spindles of the fluid operated cylinders 10 and 11 and, in that instance, the apparatus would distribute the strand 16 in take-up areas 21 and 22.

The distributor includes an arm 24 mounted on a clamp 25 which is secured to the center of a cylinder 26. The strand 16 passes through a guide 27 mounted on the arm 24 and around a grooved roller 28 beneath a retaining roller 29 and between a pair of fingers 30 positioned closely adjacent the areas 17—18 and 21—22 when the distributor arm happens to be adjacent those areas.

The cylinder 26, as shown in FIG. 6, is supported for reciprocable movement on a piston rod 32, the ends of which are fixed at 33, while a piston 34 is mounted on the rod at the center thereof and disposed in the cylinder. While viewing FIG. 6, the fluid control system for the cylinder includes two supplies represented by pumps 36 and 37 for the fluids to operate or cause movement of the cylinder 26 on the piston rod 32. A valve 38 under the control of two solenoids, identified in this figure and also in FIGS. 4 and 5 as Sol. 1 and Sol. 2, alternately supplies fluid to lines 40 and 41 at predetermined low pressures to cause distributing movement to the cylinder to impart the desired motion to the distributor to evenly distribute the strand in the selected areas.

The pump 37 supplies fluid under a high pressure to an accumulator tank 42, an outlet line 43 of which is under the control of a valve 44 having lines 45 and 46 extending to lines 40 and 41 respectively. The valve 44 is under the control of solenoids identified as Sol. 3 and Sol. 4. The valve 44 differs from the valve 38 in that there is a neutral position registering normally with line 43 to close this line and open it only when either Sol. 3 or Sol. 4 should be energized. Furthermore, check valves 47 and 48 are disposed in lines 40 and 41 between lines 45 and 46 and their respective sides of the valve 38, to prevent disturbance in the area of valve 38 during opening of valve 44.

The electrical control begins with the arrangement of certain limit switches, shown structurally in FIG. 1, and adjustably mounting them on a rod 50, the ends of which are mounted in brackets 51. The positions of the limit switches on the rod 50 are very important in that they control the limits of the distributing areas or the areas the distributor lays the strand on the take-up members. For further illustration, the schematic showing of these areas in FIG. 3 are identified with the same characters as applied to the switches. For example, switches L1 and L2 control distribution of the strand between the limits L1 and L2 which, in this illustration, is the left small reel shown in FIG. 3. Also, limit switches L3 and L4 control the distribution of the strand in the area represented by the limits L3 and L4 of FIG. 3. Limit switches L7 and L8 combine respectively with limit switches L2 and L3 at times when limit switches L1 and L4 are rendered ineffective to bring about distribution of the strand in areas represented in FIG. 3 by limits L7 and L2, in one instance, and L3 and L8 in the other instance.

With frequent reference to FIGS. 3 and 4, the electrical controls, illustrated in FIG. 5, may be understood more readily. These controls are divided into three main but inter-related parts including the distribution control, causing movement of the cylinder 26 and the distributor arm 24 at predetermined speeds to distribute the strand or wire uniformly in the different areas. Another part of the control is identified as rapid transfer control which is rendered effective in response to a counter unit 53, a counter relay of which is adapted to close its normally open contact CR when a measured quantity of strand or wire has been distributed in any one of the areas or reels to set in operation means to transfer the cylinder 26 and the distributor 24 at rapid speed to the next position or distributing area. The third feature of this control is a rapid transfer direction selector which is conditioned shortly following each transfer of the distributor from one area to another to condition the rapid transfer control for movement in the reverse direction, the next time the contact CR of the counter unit is closed.

By viewing FIG. 1 momentarily, it will be noticed that the distributor arm 24 is being moved to the right from the area 17 of reel 14 toward the area 18 of the empty reel 15. Let it be assumed for the purpose of illustration, that the distributor is back in the area 17 and that the reel 14 has not received its full quota of strand material. Let it be assumed further that the distributor is moving to the left. This will position an actuator 55, which is mounted on the cylinder 26 and carrying bearings 56 for guided movement on a rod 57, the ends of which are supported at 58, between limit switches L1 and L2.

A cam-like surface 59 of the actuator 55 may be of any desired contour capable of engaging the rollers of the limit switches L1 to L8, inclusive. In the present illustration, the actuator would be in the areas of the limit switches L1, L5, and L2 spaced from L2 to the left and approaching L1. During each transverse action of the actuator 55, in moving between actuating switches L1 and L2, switch L5 is opened causing no action in the control circuits as limit switches L5 and L6 are effective only to open circuits previously closed by the counter relay contact CR.

The limit switches L1 to L8, inclusive, are adjustably mounted on their supporting bar 50 so that their actions will bring about the desired results. The limit switches are secured in variable positions by suitable means, such as set screws 60. Limit switches L1 and L2 cause reversing actions when the distributor reaches the corresponding limits L1 and L2 of FIG. 3. In a similar manner, limit switches L3 and L4 cause reversing actions when the distributor reaches the limits L3 and L4 of FIG. 3. If the distributor is to move throughout the areas 21 and 22, that is, between limits L7 and L2 of FIG. 3 and also throughout area 22 FIG. 1, that is, between the limits L3 and L8, then limit switches L1 and L4 are rendered ineffective and the reversing actions take place at limits L7 and L2 of FIG. 3 in response to switches L7 and L2 of FIG. 1 and the limits L3 and L8 of FIG. 3 in response to limit switches L3 and L8 of FIG. 1.

Returning now to the previously assumed position of the distributor in the area 17, FIG. 1, and the actuator 55 moving left from L2 toward L1, this movement will continue until switch L1 is closed. At this time, attention is directed to the position of selector switches 62 and 63 at their top contacts rendering effective limit switches L1 to L4, inclusive, and rendering ineffective limit switches L7 and L8. When the actuator 55 closes switch L1, a circuit is completed from line 64 through closed switch 62, close limit switch L1, normally closed contact R2–2, Sol. 1, to the other line 65. Energization of Sol. 1 operates valve 38 to cause movement of the distributor to the right as illustrated by the arrow associated with Sol. 1 in FIG. 4. This movement continues until the actuator 55 engages and closes limit switch L2 which completes a circuit from line 64 through closes switch L2, closed contact R3–3, and Sol 2 to line 65. This reverses the action of the valve 38 to move the distributor in to the left, as illustrated by the arrow associated with Sol. 2 in FIG. 4. These actions, through the alternate operations of the limit switches L1 and L2, continue until the measured amount of strand is wound in the area 17 or on the reel 14, at which time CR contact is closed completing a circuit from line 64 through closed contact CR, closed contact R1–2, closed contact R3–4, relay winding R2 to line 65. The boxed-in area about the CR contact represents any suitable commercially known counter unit adjustable and actuable by the advancing strand to cause closing of the contact CR when each predetermined length of the strand has moved relative to the counter unit. A circuit is also completed through a locking circuit for this relay under the control of closed limit switch L6 and operated closed contact R2–1 including Sol. 4.

One portion of this circuit is traced from line 64 through closed L6, closed R2–1, connecting line 66, closed R3–4, winding R2 to line 65. Sol. 4 is energized, it being in a portion of the circuit between the connection with line 66 and line 65. This action brings into operation, through the operation of Sol. 4, rapid movement to the right of the cylinder 26, through the operation of valve 44 to the high pressure chamber 42, to move the distributor 24 rapidly to the right until limit switch L6 is opened by the actuator 55 which stops the rapid transfer motion at a selected position between limit switches L3 and L4 and at an intermediate point between the limits L3 and L4 of FIG. 3.

This action, including the rapid transfer of the strand from the area 17 to the area 18, that is, from the reel 14 to the reel 15, takes place under high pressure and instantaneously therewith, other circuits are conditioned. For example, energization of relay R2 closes contacts R2–1 and R2–3 but opens contacts R2–2 and R2–4. As a result, limit switch L3 is rendered ineffective for action during movement of the actuator 55 to the right until it reaches limit switch L6 and through the closing of contact R2–3, Sol. 2, is energized to immediately start movement of the distributor to the left, after it has been stopped in the rapid transfer by switch L6. This action is desired for the conventional connecting of the strand or wire to the new reel and also the connection of the trailing end of the strand to the old reel prior to the cutting of the strand between the reels by conventional means, not shown.

During the next series of operations, Sol. 1 and Sol. 2 will be responsive to the closing of limit switches L3 and L4 until the area 18 or the reel 15 has received the measured quantity of strand or wire. At this point, attention is directed to the fact that limit switches L1, L4, L7, and L8 are of double acting types, their main contacts for the distribution control area being shown in the lower portion of FIG. 5, while the other contacts thereof are illustrated in the rapid transfer direction selector portion in the upper part of FIG. 5. Here contacts are identified as L1A, which is normally closed, L4A which is normally open, L7A which is normally closed, and L8A which is normally open. By this, it is meant that when switches L1 and L7 are operated closed, their auxiliary contacts L1A and L7A are opened, whereas during closing of contacts L4 and L8, their auxiliary contacts L4A and L8A are also closed. Returning now to the action of the distributor, after it has been moved through the rapid transfer control to the area 18 of FIG. 1, stopped in its movement by opening of L6, moved to the left by energization of Sol. 2, and subsequently moved to the right by energization of Sol. 1, until L4 is operated closed, operation of L4 will cause closing of its auxiliary switch L4A to complete a circuit from line 64 through switch 63, closed L4A, through winding of relay R1 to line 65.

Energization of relay R1 will close contacts R1–1 to complete a locking circuit through relay R1 until auxiliary contacts L1A are opened subsequent to the next rapid transfer to area 17. Therefore, the rapid transfer direction selector is set for the next rapid transfer control and relay R1 remains energized holding R1–1 closed, R1–2 open, and R1–3 closed.

While in the area 18, the distributing drive is responsive to limit switches L3 and L4, causing the distributor 24 through the action of the cylinder 26 to move between limits L3 and L4 of FIG. 3. At this time, the filled reel 14 may be removed and an empty reel disposed in its place. When the area 18 or the reel 15 has received its measured amount of strand or wire, the contacts CR are again closed but at this time, through the closed R1–3. The circuit is completed from line 64 through closed contact CR, closed contacts R1–3, connecting line 67 and Sol. 3 to line 65. This brings about rapid transfer of the cylinder 26 with the distributor 24 to the left, as illustrated by the arrow associated with Sol. 3 in FIG. 4. This action continues until limit switch L5 is opened de-energizing Sol. 3. Here again, through the closing of contact CR, winding R3 is energized, through the previously closed contact R1–3 and normally closed contact R2–4, to close contact R3–2 and open contact R3–3. This brings about energization of Sol. 1 to move the distributor to the right immediately after the termination of the rapid transfer. Here again, the distributor is under the control of limit switches L1 and L2 and immediately upon energization of limit switch L1, auxiliary limit switch L1A is opened to de-energize relay R1 to again condition the circuit of the rapid transfer direction selector for the next rapid transfer action.

*Operation*

Through the action of this apparatus, it should be understood that a strand or wire may be distributed in areas of varying dimensions. In the present illustration, it has been illustrated how the strand or wire may be distributed in area 17 until the measured amount has been supplied to this area and then transferred to the area 18. In this illustration, areas 17 and 18 are of like dimensions. It should be understood, however, that areas 17 and 18 may be different dimensions and that the limits of these areas may be varied readily by varying the relative positions of the limit switches for the areas and, in this manner, varying the limits of distribution of the strand or wire.

Furthermore, in the present illustration, it has been described in detail how the strand or wire may be distributed in the areas 17 and 18. The only action needed to transfer the controls to other areas, such as areas 21 and 22, is through the operation of switches 62 and 63 to their bottom contacts effectively removing from the controls limit switches L1 and L4 with their auxiliary switches L1A and L4A and bringing into the controls, limit switches L7 and L8 with their auxiliary limit switches L7A and L8A.

In this instance, limit switches L2 and L3 remain effective to control the innermost limits L2 and L3, as illustrated in FIG. 3, while limit switches L7 and L8 are rendered effective to control the outer limits identified as L7 and L8 in FIG. 3. Here again, the areas 21 and 22 have been illustrated as being of like lengths, but it should be understood that these dimensions may be varied relative to each other by varying the positions of the limit switches L7—L2 and L3—L8 on the rod 50.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:
1. An apparatus for distributing a strand in predetermined areas on rotatably driven takeup members of different lengths when disposed in said areas comprising:
   a distributor arm for the strand,
   a reciprocable element supporting the arm for movement relative to the takeup members in said areas,
   means to support the element for reciprocal movement,
   an actuator for limit switches mounted on the element and movable therewith,
   limit switches mounted at predetermined fixed positions corresponding to the known different lengths of the takeup members and operable by the actuator,
   actuable power control means responsive to the switches to reciprocably cause movement of the element,
   selective means actuable at different intervals to render certain of the switches effective and others of the switches ineffective to actuate the power control means to cause the element to move the distributor arm between predetremined different limits in the areas of the takeup members of different lengths,
   counter contacts,
   means for closing the counter contacts when a measured amount of strand is distributed in an area on a takeup member,
   transfer control circuits selectively closed by closing of the counter contacts to cause the element moving power control means to transfer the distributor arm to another area, and
   actuable auxiliary power control means rendered effective by closing of the counter contacts to assist the power control means for the element to cause rapid transfer of the element and distributor arm from the area of one takeup member to the area of another takeup member.

2. An apparatus for distributing a strand in predetermined areas on rotatably driven takeup members of different lengths when disposed in said areas comprising:
   a distributor arm for the strand,
   a reciprocable element supporting the arm for movement relative to the takeup members in said areas,
   means to support the element for reciprocal movement,
   an actuator for limit switches mounted on the element and movable therewith,
   limit switches mounted at predetermined fixed positions corresponding to the known different length of the takeup members and operable by the actuator,
   actuable power control means responsive to the switches to reciprocably cause movement of the element,
   selective means actuable at different intervals to render certain of the switches effective and others of the switches ineffective to actuate the power control means to cause the element to move the distributor arm between predetermined different limits in the areas of the takeup members of different lengths,
   counter contacs,
   means for closing the counter contacts when a measured amount of strand is distributed in an area on a takeup member,
   transfer control circuits selectively closed by the closing of the counter contacts to cause the element moving power control means to transfer the distributor arm to another area,
   actuable auxiliary power control means rendered effective by closing of the counter contacts to assist the power control means for the element to cause rapid transfer of the element and distributor arm from the area of one takeup member to the area of another takeup member,
   direction transfer control circuits, and
   means responsive to one of the direction transfer control circuits to cause the rapid transfer of the element to move the distributor arm and strand in one direction to an area of one takeup member and to condition another of the transfer control circuits to be closed by the counter contacts to subsequently rapidly transfer the strand in a reverse direction to the area of the other takeup member.

References Cited in the file of this patent
UNITED STATES PATENTS

| | | |
|---|---|---|
| 2,669,333 | Johnson | Feb. 16, 1954 |
| 2,845,229 | Bliss | July 29, 1958 |
| 2,929,569 | Detrick et al. | Mar. 22, 1960 |

FOREIGN PATENTS

| | | |
|---|---|---|
| 720,807 | Great Britain | Dec. 29, 1954 |